United States Patent
Klein et al.

(10) Patent No.: US 8,611,650 B2
(45) Date of Patent: Dec. 17, 2013

(54) METHOD AND DEVICE FOR LANE DETECTION

(75) Inventors: Wladimir Klein, Lindau (DE); Michael Walter, Widnau (CH)

(73) Assignee: Conti Temic microelectronic GmbH (DE)

( * ) Notice: Subject to any disclaimer, the term of this patent is extended or adjusted under 35 U.S.C. 154(b) by 72 days.

(21) Appl. No.: 13/256,664

(22) PCT Filed: Mar. 18, 2010

(86) PCT No.: PCT/DE2010/000302
§ 371 (c)(1),
(2), (4) Date: Dec. 1, 2011

(87) PCT Pub. No.: WO2010/111992
PCT Pub. Date: Oct. 7, 2010

(65) Prior Publication Data
US 2013/0004067 A1    Jan. 3, 2013

(30) Foreign Application Priority Data
Mar. 30, 2009  (DE) .......................... 10 2009 003 698

(51) Int. Cl.
*G06K 9/00* (2006.01)

(52) U.S. Cl.
USPC ........................... 382/165; 382/162; 382/274

(58) Field of Classification Search
USPC .......................... 382/103, 162, 165, 167, 274; 348/223.1, 148, 254
See application file for complete search history.

(56) References Cited

U.S. PATENT DOCUMENTS

| | | | |
|---|---|---|---|
| 7,881,496 B2* | 2/2011 | Camilleri et al. | 382/104 |
| 2006/0033823 A1* | 2/2006 | Okamura | 348/254 |
| 2010/0074469 A1* | 3/2010 | Nakamori et al. | 382/103 |

FOREIGN PATENT DOCUMENTS

| | | |
|---|---|---|
| DE | 19918050 A1 | 11/1999 |
| DE | 10059895 A1 | 5/2002 |
| DE | 102004061822 A1 | 3/2006 |
| DE | 102004061998 A1 | 7/2006 |
| EP | 1304607 A1 | 4/2003 |
| EP | 1887521 A1 | 2/2008 |
| JP | 2006-209209 | 8/2006 |

OTHER PUBLICATIONS

D'Cruz, C. et al:, "Lane detection for driver assistance and intelligent vehicle applications," Communications and Information Technologies 2007, 1291-1296.
German Search Report mailed Jan. 13, 2010, in related Application No. DE 10 2009 003 698.9 (with partial English translation).
International Search Report for PCT/DE2010/000302 filed Mar. 18, 2010, mailed Aug. 3, 2010.

* cited by examiner

*Primary Examiner* — Ali Bayat
(74) *Attorney, Agent, or Firm* — RatnerPrestia

(57) ABSTRACT

A method for lane detection, wherein a digitized color image of a roadway is processed using the following steps:
identifying markings on the roadway with a grayscale value below the grayscale value of the roadway (S18), setting the grayscale value of the markings thus identified to a value above the grayscale value of the roadway, and outputting the image thus processed and modified to be processed by a lane detection algorithm for monochrome images.

10 Claims, 3 Drawing Sheets

METHOD AND DEVICE FOR LANE DETECTION

CROSS REFERENCE TO RELATED APPLICATIONS

This application is the U.S. National Phase Application of PCT/DE2010/000302, filed Mar. 18, 2010, which claims priority to German Patent Application No. 10 2009 003 698.9, filed Mar. 30, 2009, the contents of such applications being incorporated by reference herein.

FIELD OF THE INVENTION

The invention relates to a method and a device for lane detection.

BACKGROUND OF THE INVENTION

Increasingly, driver assistance systems are used in vehicles which assist the driver in keeping the vehicle in its lane. Assistance systems warning the driver of an unintended departure from the vehicle lane are referred to in English as lane departure warning systems (LDWS). Systems which can intervene in the steering process directly are referred to in English as lane keeping systems (LKS). In German, these systems are generally referred to as lane keeping assistance systems (Spurhalteassistenzsysteme).

Lane keeping assistance systems are normally able to detect the lane in front of a vehicle (so called lane detection), i.e. in particular the course of the road. In particular the lane width, the horizontal and/or vertical curvature of the road, the lateral offset relative to the center of the lane and the pitch and yaw angles of the vehicle are estimated by the lane keeping assistance systems. From these system quantities the time can be calculated until the vehicle departs from the lane, and the driver can be warned of an unintended departure from the lane or the vehicle can be kept in its lane by electric steering or a specific ESP (electronic stability program) intervention.

The above-mentioned system quantities can be determined in particular by digital image processing of the situation in front of a vehicle, captured with an optical sensor, for example a CMOS camera. For this purpose a specific image processing algorithm is used, which evaluates structures in the captured images which are characteristic of a vehicle lane and its course, in particular roadway markings. The correct functioning of a lane keeping assistance system based on such image processing depends mainly on the fact that in the captured digital images the structures which are essential for lane detection, such as roadway markings, are detected in a reliable and precise manner. Normally, monochrome cameras are used to capture the images. The grayscale-value-based lane detection algorithms used for evaluating the images detect markings in the captured monochrome images mainly due to the dark-light/light-dark transitions between the road and the roadway markings. However, a reliable detection of the markings is ensured only for light markings on a dark ground, and not necessarily for colored markings, the grayscale value of which in the image is below the grayscale value of the ground or the road. For example, in the U.S. road sections are marked using dark yellow markings on a light ground and in Germany construction sites are indicated by yellow markings, and in Austria dark red markings are used on a light ground. These markings are very well visible to the human eye; not so, however, to a lane detection system using a monochrome camera, since the color impression is an optical one.

DE 10 2004 061 822 A1, which is incorporated by reference, shows a method for the detection of roadway markings, in particular in the area of construction sites, wherein the roadway markings are present in the form of image coordinates which are determined from a colored image of the surroundings of a motor vehicle. Here, yellow and white roadway markings are identified based on saturation values and hue values.

SUMMARY OF THE INVENTION

Disclosed herein is a method and a device for lane detection which enable a reliable lane detection also in the situations explained above, when colored markings are present.

According to one aspect of the invention, in a method for lane detection, a digitized color image of a roadway is processed using the following steps: identifying markings on the roadway with a grayscale value below the grayscale value of the roadway (S18), setting the grayscale value of the markings thus identified to a value above the grayscale value of the roadway (S20), outputting the image thus processed and modified to be processed by a lane detection algorithm for monochrome images (S22).

According to another aspect of the invention, the device for lane detection is designed to process a digitized color image of a roadway as follows: identifying markings on the roadway with a grayscale value below the grayscale value of the roadway, setting the grayscale value of the markings thus identified to a value above the grayscale value of the roadway, and outputting the image thus processed and modified to be processed by a lane detection algorithm for monochrome images.

A color imager is used to capture images, and a specific preprocessing is performed with regard to the captured digitized color images, such that conventional algorithms for lane detection, which are based on monochrome images, can also reliably detect colored markings. Preprocessing comprises the following steps: in a roadway color image which has been digitized using a color imager, markings on the roadway are identified having a grayscale value below the grayscale value of the roadway; the grayscale value of the markings thus identified is then set to a value above the grayscale value of the roadway, such that a subsequent lane detection algorithm can identify the colored markings as markings which are essential for lane detection due to the dark-light/light-dark transitions now being sufficient after preprocessing. The grayscale value of a picture element of a color image here means the grayscale value this picture element assumes on conversion of the color image to a monochrome image. With the invention, therefore, tried and tested lane detection algorithms which process monochrome images can be continued to be used. Despite the use of such algorithms, the invention enables a reliable detection of colored markings.

Now, according to one embodiment, the invention relates to a method for lane detection, wherein a digitized color image of a roadway is processed using the following steps:
  identifying markings on the roadway with a grayscale value below the grayscale value of the roadway,
  setting the grayscale value of the markings thus identified to a value above the grayscale value of the roadway, and
  outputting the image thus processed and modified to be processed by a lane detection algorithm for monochrome images.

The digitized color image can come from a color imager, which, for example, can be built into a color camera of a driver assistance system, in particular a lane detection system. Identifying the markings can occur via a pixel analysis of the digitized image, wherein the grayscale value of each pixel is determined, and the grayscale value which has been identified for the majority of the analyzed pixels is then used as the grayscale value of the roadway. All pixels having a grayscale value lower than the "majority" grayscale value determined in this manner can then be associated with the markings which have a lower grayscale value than that of the roadway. To avoid classification as markings of single picture elements in the image which are not markings but have a lower grayscale value than that of the roadway, furthermore only pixels with a lower grayscale value than that of the roadway can be associated with a marking if they exceed a particular expansion in the image or if they have a particular shape, such as an elongated linear structure which would be typically produced by a road marking, for example.

The method can further be characterized by the following steps:

evaluating the single color components of the color image and identifying the colors of markings on the roadway based on the evaluated color components.

It is thus possible to specifically identify colored markings in the image as well as their color, which in particular enables a distinction between or a classification of markings in the image, for example in such a manner that markings are classified either as road markings, construction site markings or other specific markings.

In particular, the identified colors of markings can be outputted for plausibilization of a lane detection. For example, based on the outputted colors of markings, a lane detection algorithm can determine whether single markings classified by it as road markings have been classified correctly. If it turns out, for example, that a marking classified as a road marking has a yellow or red color which is not or only rarely used for road markings, the lane detection algorithm can ignore such markings for the purpose of lane detection.

To take account of changing lighting conditions such as sunrise/sunset, driving through tunnels with artificial light, etc., an automatic white balance of the color image can be performed prior to the step of identifying the markings.

In particular, the white balance can be performed by adaptive evaluation of the roadway immediately in front of a vehicle.

Furthermore, for this purpose a segment of the roadway can be selected which is sufficiently large so as to be able to neglect any influence of local variations in chromaticness on the white balance. Potential local variations in chromaticness are thus not so significant.

Assuming a roadway of neutral color, first and foremost a color difference and, as a function thereof, a correction factor for the white balance can be determined.

According to a further embodiment, the invention relates to a device for lane detection which is designed to process a digitized color image of a roadway as follows:

identifying markings on the roadway with a grayscale value below the grayscale value of the roadway, setting the grayscale value of the markings thus identified to a value above the grayscale value of the roadway, and outputting the image thus processed and modified to be processed by a lane detection algorithm for monochrome images.

According to one embodiment of the invention, the device can further be designed to carry out a method according to aspects of the invention and as explained above.

Furthermore, according to one embodiment, the invention relates to an automatic lane change warning system or lane keeping system which comprises a device according to aspects of the invention and as previously described.

Finally, according to one embodiment, the invention relates to a vehicle having an automatic lane change warning system or lane keeping system according to aspects of the invention and as previously described.

Further advantages and possibilities of applications of the present invention will become apparent from the following description in conjunction with the exemplary embodiments presented in the drawings.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
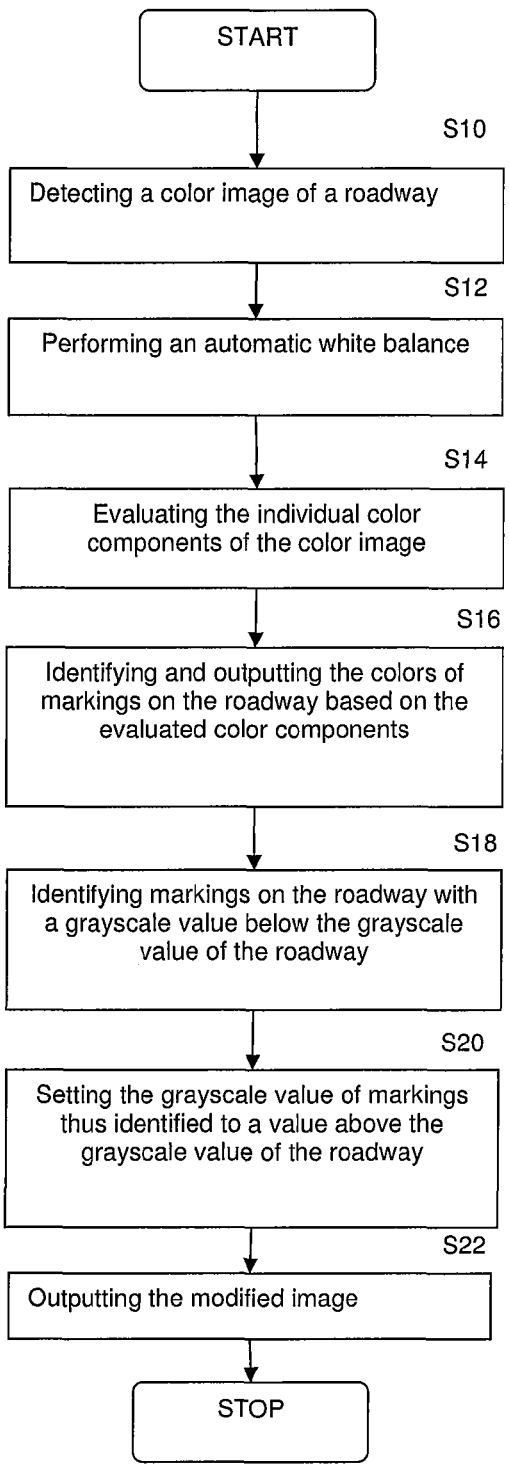
FIG. 1 shows a flowchart of an exemplary embodiment of the method for lane detection by means of a color image according to aspects of the invention.

In the following, identical elements and/or functionally similar elements can be denoted by like reference numerals. The absolute values and measurements given hereinafter are merely examples and do not limit the invention to such dimensions.

The method for lane detection according to aspects of the invention is used to process color images such that they are suitable to be processed by a lane detection algorithm which operates on the basis of monochrome images and white markings on a roadway as are normally used in many countries to mark traffic lanes. A flowchart of a program which implements the method according to aspects of the invention is shown in FIG. 1. The method will be explained hereinafter with reference to the flowchart represented in FIG. 1 and the images of a roadway shown in FIGS. 2 and 3.

First of all, in step S10 of the method a color image 10 of a roadway in front of a vehicle is captured, in particular using a color camera which is mounted, for example, to the windshield of the vehicle in the area of the rear view mirror. The colors in the color image can be coded according to the RGB or YUV color space, for example.

In step S12 the color image is subjected to automatic white balancing to take account of changing lighting conditions. To perform the white balance, a segment 18 of the roadway is selected from the image 10 such that the influence of local variations in chromaticness on the white balance can be neglected. As can be seen from FIG. 2, essentially the largely homogeneous roadway having no markings was selected as segment 18, such that there are no larger variations in chromaticness, but only smaller local variations.

Subsequently the color components contained in the color image are evaluated in step S14, for example by separating the RGB components such that one image having R components, one having G components and one having B components is obtained. In each of these images markings which are essential for lane detection are now identified using a pattern recognition algorithm. Most notably, in this way it can be determined which color(s) or color components individual markings have, which can be important for lane detection because, for example, colored construction site markings can be detected quickly and distinguished clearly from normal white road markings. Furthermore the identified colors of the markings can be outputted and used for plausibilizing markings which are detected by lane detection on the basis of monochrome images. The colors of markings identified in step S14 are outputted in step S16 for plausibilization (i.e., verification) by a lane detection.

Figure 2:
FIG. 2 shows a monochrome image, captured with a camera of a vehicle, of a roadway having a yellow edge marking of a lane, prior to performing the method of the invention.

The following steps S18 to S22 are performed using a monochrome representation of the color image 10. FIG. 2 shows an example of such a color image 10 in a monochrome representation, i.e. after conversion of the color image to a grayscale value image. The roadway 12 which can be seen in the image has two lanes which are separated from each other by a white centerline marking 14. Moreover, the left lane is delimited on the left-hand side by a yellow edge marking 16, which, due to the monochrome representation, is much harder to recognize in FIG. 2 than the white centerline marking. Due to the conversion of the color image to a grayscale value image 10, the grayscale value of the yellow edge marking 16 is below that of the roadway, as can be clearly seen in FIG. 2. A lane recognition algorithm operating on the basis of monochrome images would therefore not classify the yellow edge marking as a marking which is essential for lane detection.

Figure 3:
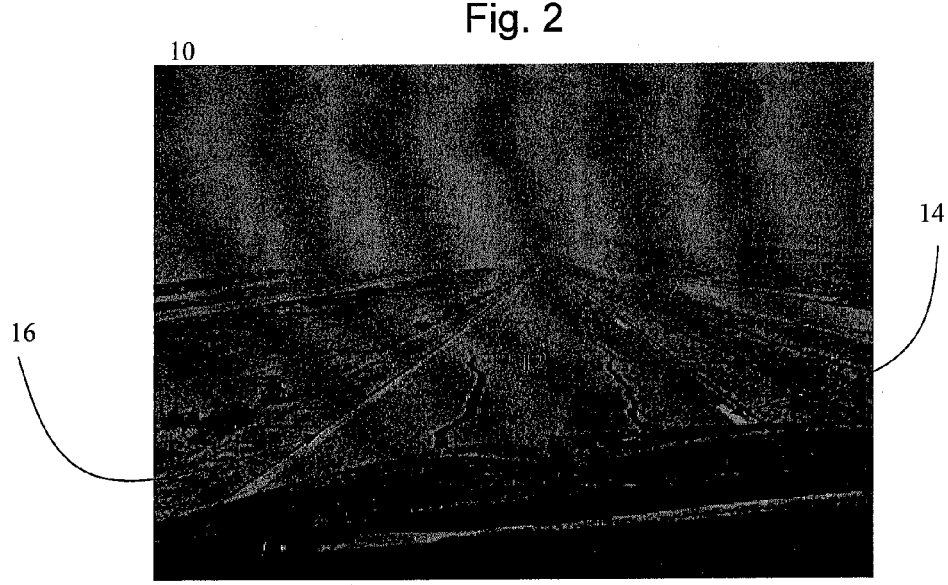
FIG. 3 shows a monochrome image, captured with a camera of a vehicle, of a roadway having a yellow edge marking of a lane, after performing the method of the invention.

In step S18 markings on the roadway are therefore identified which have a grayscale value below the grayscale value of the roadway, such as the yellow edge marking 16 in FIG. 2. In the subsequent step S20 the grayscale values of the markings identified in step S18 are then set to a value above the grayscale value of the roadway, i.e. the image is modified. An image 10 thus modified is shown in FIG. 3. The yellow edge marking 16 is now clearly recognizable, as is the white centerline marking 14. The markings 14 and 16 now have sufficiently large light-dark/dark-light differences in relation to the roadway to be identified by a lane detection algorithm operating on the basis of monochrome images as markings which are essential for lane detection. Finally, the image 10 thus processed and modified is outputted in step S22 to be supplied to a lane detection algorithm for processing.

Figure 4:
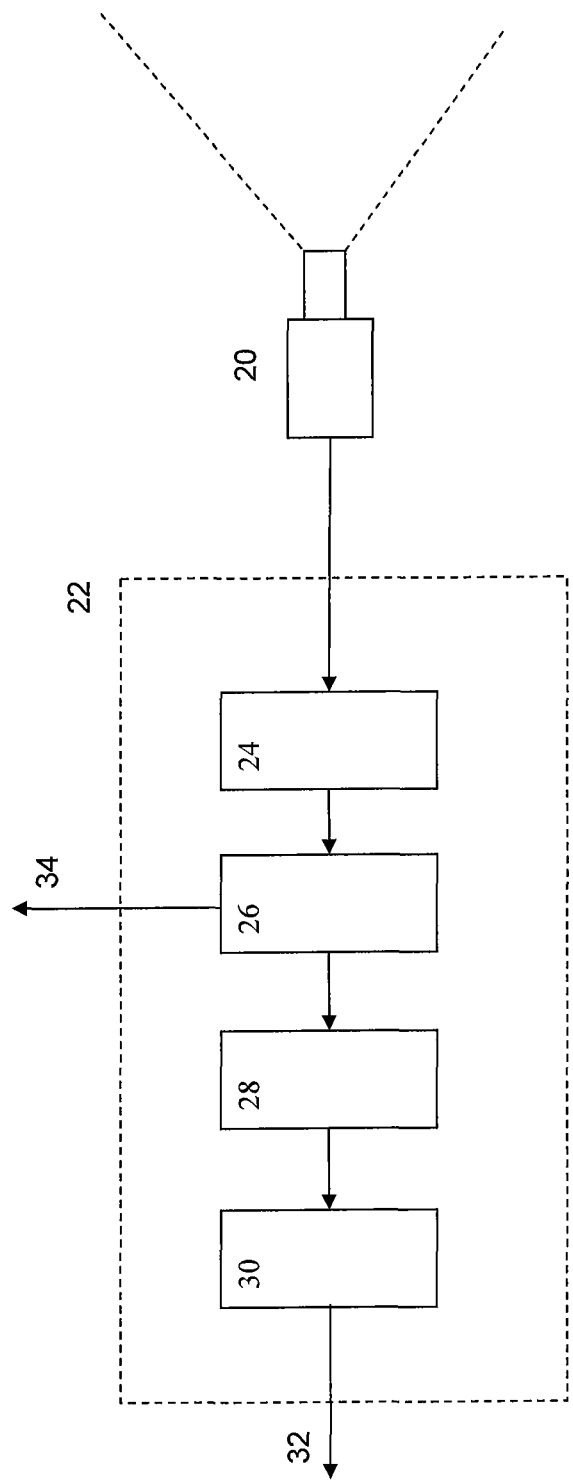
FIG. 4 shows a block diagram of an exemplary embodiment of a device for lane detection by means of a color image according to aspects of the invention.

FIG. 4 shows a lane detection device 22 for processing the digitized images captured by a vehicle color camera 20 according to aspects of the invention. The device 22 comprises a white balancer 24 for performing method step S12, a color component determiner 26 for performing method steps S14 and S16 and outputting data 34 regarding the colors of identified markings, a grayscale value determiner 28 for performing method step S18 and a grayscale value modifier 30 for performing method steps S20 and S22 and outputting the modified monochrome image for a lane detection. The elements 24, 26, 28 and 30 can be implemented, for example, by a powerful microprocessor, which is configured by a special program such that it can implement the method according to aspects of the invention as represented, for example, in FIG. 1 in a flowchart. Individual or all elements can also be implemented in logic, for example in the form of one or more FPGA (field programmable gate array) modules.

REFERENCE NUMERALS 10 image of a roadway
12 roadway
14 centerline marking for demarcation of the two lanes
16 yellow edge marking of the left lane
18 segment for white balancing
20 lane detection device
22 color camera
24 white balancer
26 color component determiner
28 grayscale value determiner
30 grayscale value modifier
S10-S22 method steps

The invention claimed is:

1. A method for lane detection, wherein a digitized color image of a roadway is processed using the following steps:
evaluating individual color components of the color image;
identifying the colors of markings on the image of the roadway based on the evaluated color components;
identifying the markings on the image of the roadway with having a grayscale value below a grayscale value of the roadway;
setting the grayscale value of the identified markings to a value above the grayscale value of the roadway; and
outputting the image for processing by a lane detection algorithm for monochrome images.

2. The method according to claim 1 further comprising the steps of:
outputting the identified colors of markings for verification of a lane detection.

3. The method according to claim 1, wherein
prior to the step of identifying markings, an automatic white balance of the color image is performed.

4. The method according to claim 3, wherein
the white balance is performed by adaptive evaluation of the roadway immediately in front of a vehicle.

5. The method according to claim 4, wherein
a segment of the roadway is selected which is sufficiently large so as to be able to neglect any influence of local variations in chromaticness on the white balance.

6. A method for lane detection, wherein a digitized color image of a roadway is processed using the following steps:
identifying markings on an image of the roadway with a grayscale value below a grayscale value of the roadway,
setting the grayscale value of the identified markings to a value above the grayscale value of the roadway,
outputting the image for processing by a lane detection algorithm for monochrome images,
wherein prior to the step of identifying markings, an automatic white balance of the color image is performed, and
further comprising the step of determining a color difference and, as a function thereof, a correction factor for the white balance, assuming a roadway of neutral color.

7. A device for lane detection that is configured to process a digitized color image of a roadway as follows:
evaluating individual color components of the color image;
identifying the colors of markings on the image of the roadway based on the evaluated color components;
identifying the markings on the image of the roadway with having a grayscale value below a grayscale value of the roadway,
setting the grayscale value of the identified markings to a value above the grayscale value of the roadway, and
outputting the image for processing by a lane detection algorithm for monochrome images.

8. An automatic lane detection system comprising a device according to claim 7 and outputting traffic lane data.

9. A lane change warning system or a lane keeping system comprising an automatic lane detection system according to claim 8 that is configured to process the traffic lane data outputted by said lane detection system to detect a lane change.

10. A vehicle including a lane change warning system or a lane keeping system according to claim 9.

* * * * *

UNITED STATES PATENT AND TRADEMARK OFFICE
CERTIFICATE OF CORRECTION

PATENT NO.        : 8,611,650 B2                                              Page 1 of 1
APPLICATION NO.   : 13/256664
DATED             : December 17, 2013
INVENTOR(S)       : Klein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 135 days.

Signed and Sealed this

Twenty-second Day of September, 2015

Michelle K. Lee
*Director of the United States Patent and Trademark Office*